United States Patent
Maric et al.

(10) Patent No.: US 11,892,701 B2
(45) Date of Patent: Feb. 6, 2024

(54) LENS MOUNTING STRUCTURES FOR HEAD-MOUNTED DEVICES

(71) Applicant: Apple Inc., Cupertino, CA (US)

(72) Inventors: Ivan S. Maric, San Francisco, CA (US); Forrest C. Wang, Petaluma, CA (US); Jan K. Quijalvo, Santa Clara, CA (US); John N. Border, Campbell, CA (US); Steven M. Scardato, Sunnyvale, CA (US); Wey-Jiun Lin, Los Altos Hills, CA (US)

(73) Assignee: Apple Inc., Cupertino, CA (US)

(*) Notice: Subject to any disclaimer, the term of this patent is extended or adjusted under 35 U.S.C. 154(b) by 253 days.

(21) Appl. No.: 17/192,728

(22) Filed: Mar. 4, 2021

(65) Prior Publication Data

US 2021/0325625 A1 Oct. 21, 2021

Related U.S. Application Data (60) Provisional application No. 63/011,501, filed on Apr. 17, 2020.

(51) Int. Cl.
*G02B 7/02* (2021.01)
*G02B 7/00* (2021.01)
*G02B 13/18* (2006.01)
*G02B 17/08* (2006.01)
(Continued)

(52) U.S. Cl.
CPC ............... *G02B 7/02* (2013.01); *G02B 7/003* (2013.01); *G02B 13/18* (2013.01); *G02B 17/08* (2013.01); *G02B 25/001* (2013.01); *G06F 3/013* (2013.01)

(58) Field of Classification Search
CPC .......... G02B 7/02; G02B 7/003; G02B 13/18; G02B 17/08; G02B 25/001; G02B 7/12; G02B 27/0176; G02B 27/0172; G02B 7/021; G02B 27/0081; G02B 1/02; G02B 1/041; G02B 3/0062; G02B 3/0087; G06F 3/013

See application file for complete search history.

(56) References Cited

U.S. PATENT DOCUMENTS

| | | |
|---|---|---|
| 4,758,701 A | 7/1988 | Nagel |
| 5,589,978 A | 12/1996 | Fantone |
| 6,283,644 B1 | 9/2001 | Gilliland et al. |

(Continued)

FOREIGN PATENT DOCUMENTS

CN 110703444 A 1/2020

*Primary Examiner* — James C. Jones
(74) *Attorney, Agent, or Firm* — Treyz Law Group, P.C.; G. Victor Treyz; David K. Cole (57) ABSTRACT

A head-mounted device may have optical modules that present images to the user's left and right eyes. The optical modules may move with respect to each other to accommodate different user interpupillary distances. Each optical module may have a lens barrel, a display coupled to the lens barrel that generates an image, and a lens mounted to the lens barrel through which the image is viewable from an eye box. The lens may be a multi-element lens formed from molded lens elements such as molded polymer lens elements. A lens element may be provided with protrusions that form lens tabs. The lens tabs may have coplanar lens tab surfaces that mate with corresponding coplanar mounting surfaces in the lens barrel. Alignment marks may be formed on the protrusions and/or other portions of the lens.

30 Claims, 8 Drawing Sheets

(51) Int. Cl.
    *G02B 25/00*     (2006.01)
    *G06F 3/01*     (2006.01)

(56) References Cited

U.S. PATENT DOCUMENTS

| | | |
|---|---|---|
| 6,519,099 B1 | 2/2003 | Blair et al. |
| 6,587,274 B1 | 7/2003 | Border et al. |
| 6,594,084 B1 | 7/2003 | Border et al. |
| 6,748,145 B2 | 6/2004 | Border et al. |
| 6,765,603 B2 | 7/2004 | Border et al. |
| 8,427,766 B2 | 4/2013 | Ning et al. |
| 2014/0266987 A1 | 9/2014 | Magyari |
| 2017/0031165 A1* | 2/2017 | Costa .................. G02B 27/028 |
| 2017/0097512 A1 | 4/2017 | Haymond |
| 2020/0033560 A1* | 1/2020 | Weber .............. G06K 19/06028 |
| 2020/0096775 A1 | 3/2020 | Franklin et al. |

* cited by examiner

LENS MOUNTING STRUCTURES FOR HEAD-MOUNTED DEVICES

This application claims the benefit of provisional patent application No. 63/011,501, filed Apr. 17, 2020, which is hereby incorporated by reference herein in its entirety.

FIELD

This relates generally to electronic devices, and, more particularly, to wearable electronic devices such as head-mounted devices.

BACKGROUND

Electronic devices such as head-mounted devices may have displays for displaying images. The displays may be housed in optical modules. Lenses may be mounted in the optical modules. A user may view the displayed images through the lenses while a head-mounted device is being worn on the user's head.

SUMMARY

A head-mounted device may have optical modules that present images to the user's left and right eyes. The optical modules may move with respect to each other to accommodate different user interpupillary distances. Each optical module may have a lens barrel, a display coupled to the lens barrel that generates an image, and a lens mounted to the lens barrel through which the image is viewable from an eye box.

The lens in each lens barrel may be a multi-element lens such as a multi-element catadioptric lens. The lens elements of the lens may be formed from molded polymer.

To secure the lens in the lens barrel, one of the lens elements may be provided with mounting provisions forming lens tabs. The lens tabs may have coplanar lens tab surfaces that mate with corresponding coplanar mounting surfaces in the lens barrel. Alignment marks may be formed on the protrusions and/or other portions of the lens.

DETAILED DESCRIPTION

An electronic device such as a head-mounted device may have a front face that faces away from a user's head and may have an opposing rear face that faces the user's head. Optical modules on the rear face may be used to provide images to a user's eyes. Each optical module may have a lens barrel in which a lens is mounted. The lenses may be used to view displays that are mounted to the lens barrels.

Figure 1:
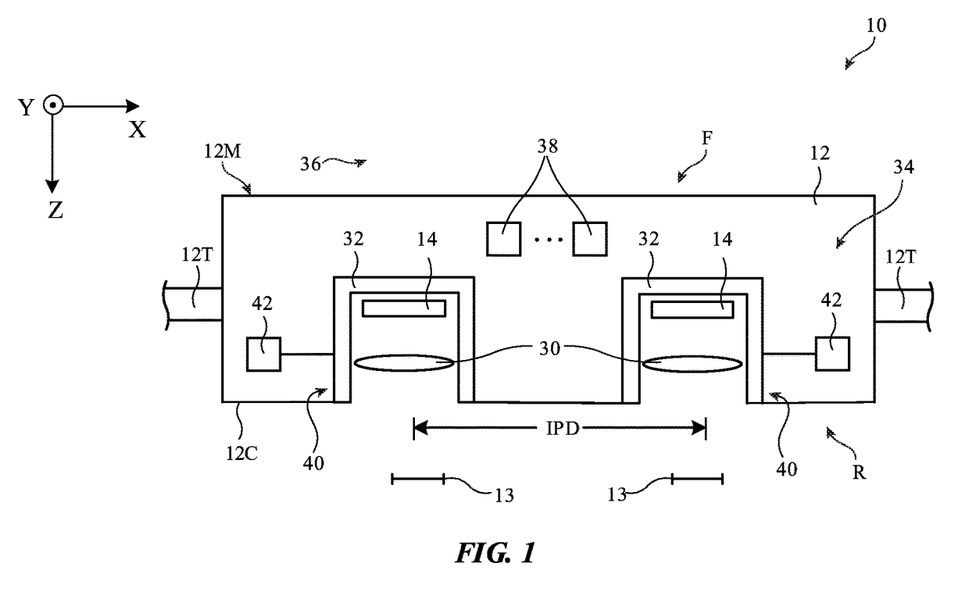
FIG. 1 is a top view of an illustrative head-mounted device in accordance with an embodiment.

A top view of an illustrative head-mounted device is shown in FIG. 1. As shown in FIG. 1, head-mounted devices such as electronic device 10 may have head-mounted support structures such as housing 12. Housing 12 may include portions (e.g., support structures 12T) to allow device 10 to be worn on a user's head. Support structures 12T may be formed from fabric, polymer, metal, and/or other material. Support structures 12T may form a strap or other head-mounted support structures to help support device 10 on a user's head. A main support structure (e.g., main housing portion 12M) of housing 12 may support electronic components such as displays 14. Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures and these rigid walls may optionally be covered with electrical components, glass, fabric, leather, or other materials. The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, a hat, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as cover 12C (sometimes referred to as a curtain). The presence of a rear housing wall structure such as cover 12C on rear face R may help hide internal housing structures, internal components 38, and other structures in interior region 34 from view by a user.

Device 10 may have left and right optical modules 40. Each optical module may include a respective display 14, lens 30, and support structure 32. Support structures 32, which may sometimes be referred to as lens barrels or optical module support structures, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30.

Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, projectors, and/or other display devices for producing images.

Lenses 30 may include one or more lens elements for providing image light from displays 14 to respective eyes boxes 13. Lenses may be implemented using refractive glass lens elements, using refractive and/or mirror lens structures (e.g., catadioptric lenses), using Fresnel lenses, using holographic lenses, and/or other lens systems.

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

It may be desirable to monitor the user's eyes while the user's eyes are located in eye boxes 13. For example, it may be desirable to use a camera to capture images of the user's irises (or other portions of the user's eyes) for user authentication. It may also be desirable to monitor the direction of the user's gaze. Gaze tracking information may be used as a form of user input and/or may be used to determine where, within an image, image content resolution should be locally enhanced in a foveated imaging system. To ensure that device 10 can capture satisfactory eye images while a user's eyes are located in eye boxes 13, each optical module 40 may be provided with a camera and an eye illumination system.

Not all users have the same interpupillary distance IPD. To provide device 10 with the ability to adjust the interpupillary spacing between modules 40 along lateral dimension X and thereby adjust the spacing IPD between eye boxes 13 to accommodate different user interpupillary distances, device 10 may be provided with actuators 42. Actuators 42 can be manually controlled and/or computer-controlled actuators (e.g., computer-controlled motors) for moving support structures 32 relative to each other. Information on the locations of the user's eyes may be gathered using, for example, cameras in lens modules 40. The locations of eye boxes 13 can then be adjusted accordingly.

Figure 2:
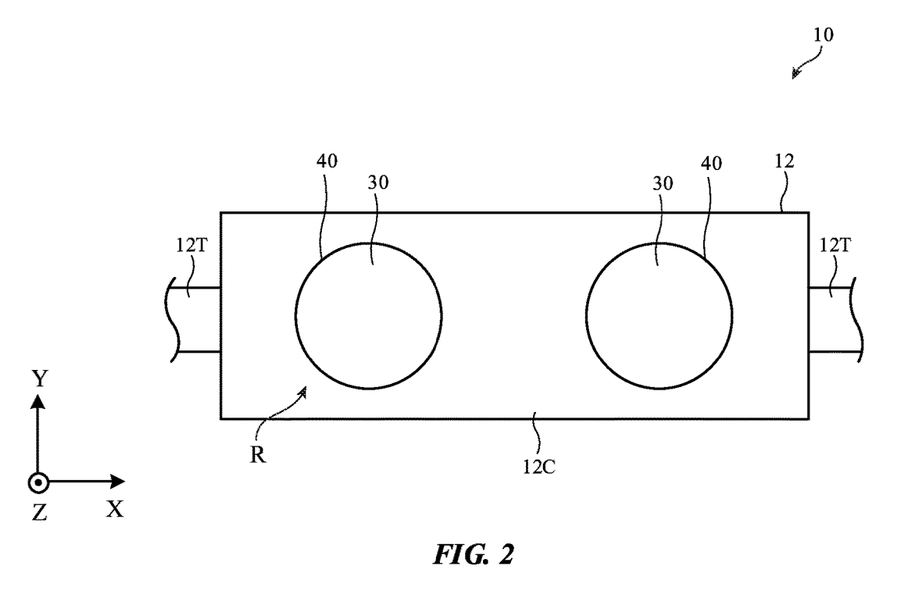
FIG. 2 is a rear view of an illustrative head-mounted device in accordance with an embodiment.

As shown in the rear view of device 10 of FIG. 2, cover 12C may cover rear face R while leaving lenses 30 of optical modules 40 uncovered (e.g., cover 12C may have openings that are aligned with and receive modules 40). As modules 40 are moved relative to each other along dimension X to accommodate different interpupillary distances for different users, modules 40 move relative to fixed housing structures such as the walls of main portion 12M and move relative to each other.

Figure 3:
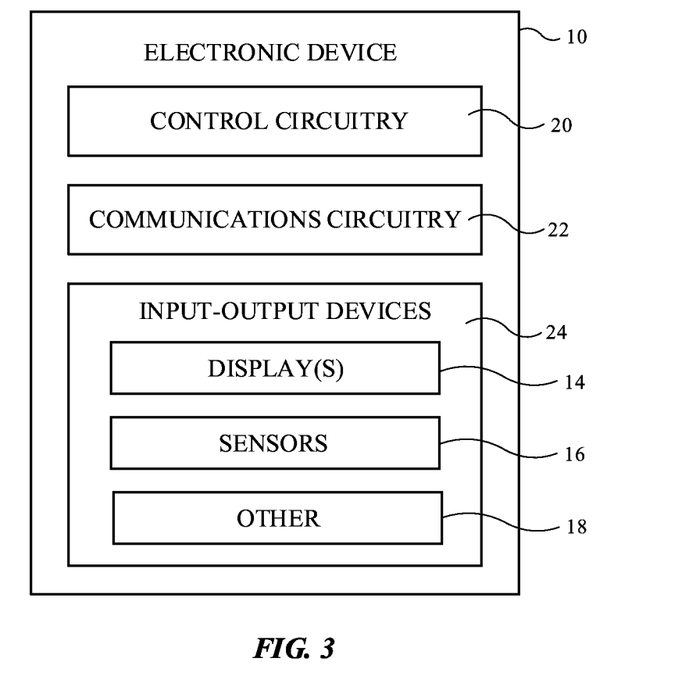
FIG. 3 is a schematic diagram of an illustrative head-mounted device in accordance with an embodiment.

A schematic diagram of an illustrative electronic device such as a head-mounted device or other wearable device is shown in FIG. 3. Device 10 of FIG. 3 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 3.

As shown in FIG. 3, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors (such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 4:
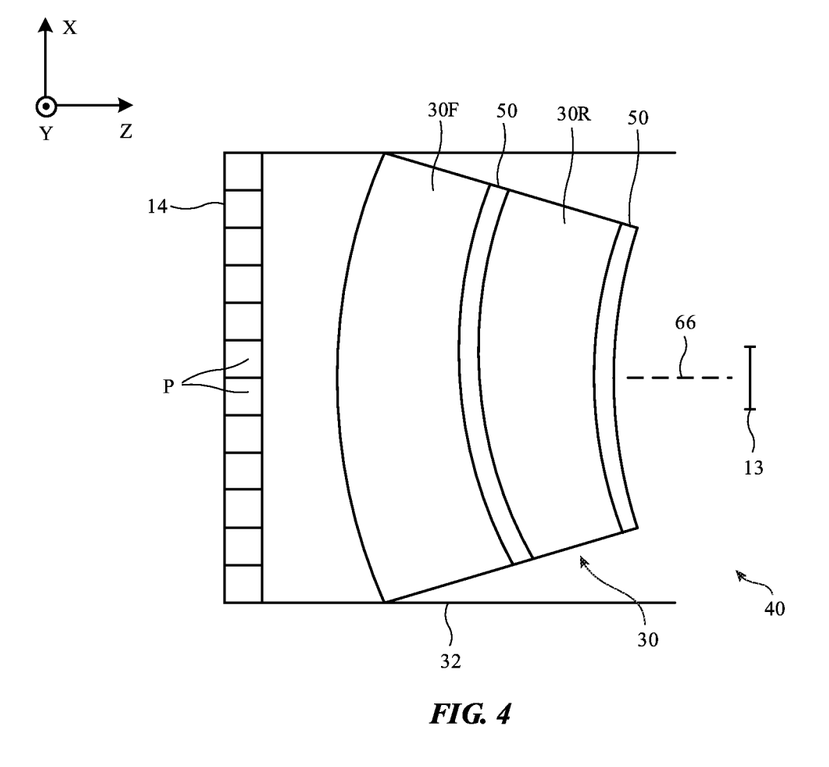
FIG. 4 is a cross-sectional side view of an illustrative head-mounted device optical module in accordance with an embodiment.

A cross-sectional side view of an illustrative optical module for device 10 is shown in FIG. 4. As shown in FIG. 4, optical module 40 may have support structures for display 14 and lens 30 such as lens barrel 32. During operation, lens 30 may be used to provide an image from pixels P of display 14 to eye box 13 along optical axis 66. Lens 30 may be formed from one or more lens elements. In an illustrative configuration, which is sometimes described herein as an example, lens 30 is a catadioptric lens having front lens element 30F and rear lens element 30R. Optical films 50 (e.g., linear polarizers, reflective polarizers, wave plates, partially reflective mirrors, antireflection coatings, and/or other optical layers) may be formed on one or more of the surfaces of the lens elements in lens 30. For example, one or more optical films and/or one or more adhesive layers for joining the lens elements and optical films together, may be interposed between lens elements 30F and 30R. One or more optical films 50 may also be formed on one or both of the exposed surfaces of lens 30. The mating surfaces of lens elements 30F and 30R may be cylindrical or may have other surface shapes (e.g., other curved shapes). The exterior surfaces of lens elements 30F and 30R may be spherical and/or aspherical. Lens elements 30F and 30R may be formed from glass, clear crystalline material such as sapphire, clear ceramic, and/or other transparent materials such as polymer. Transparent lens material (e.g., polymer, glass, etc.) may be shaped using molding techniques and/or machining techniques (e.g., using drills, milling machines, saws, polishing tools, laser-processing tools, grinding tools, and/or other tools for shaping and polishing lens 30). For example, curved and/or planar surfaces in a lens element may include molded surfaces, machined surfaces, laser-processed surfaces, etc. Configurations in which lens 30 is formed from clear polymer or glass may sometimes be described herein as an example.

Lens 30 and lens barrel 32 may be provided with mating engagement features. The features may include protruding structures, recesses, planar mounting surfaces, through-holes, grooves, and/or other engagement structures. The engagement structures may help align lens 30 (e.g., the engagement structures may serve as datums (datum references) that align elements within lens 30 to each other and/or that lens 30 relative to barrel 32, display 14, and/or eye box 13).

Figure 5:
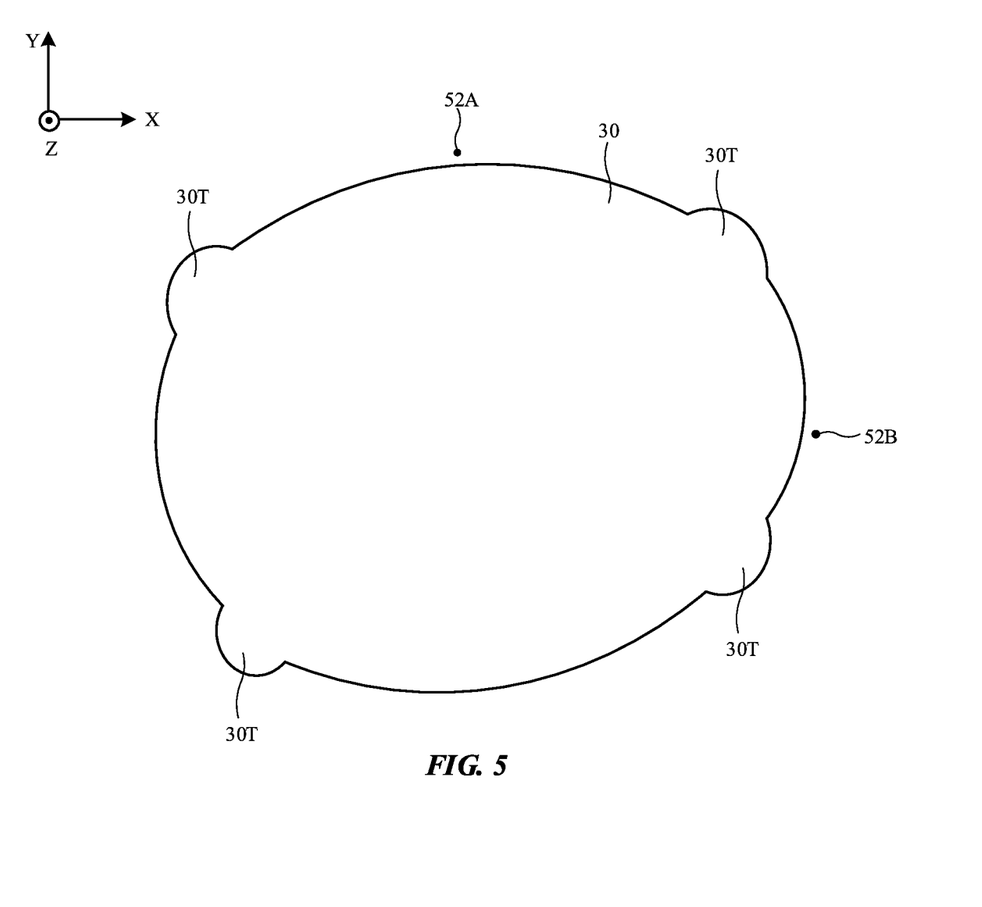
FIG. 5 is a rear view of an illustrative lens in accordance with an embodiment.

A rear view of lens 30 in an illustrative configuration in which lens 30 has been provided with tab-shaped engagement features is shown in FIG. 5. In the illustrative configuration of FIG. 5, lens 30 has a roughly oval outline with four radially protruding portions forming four respective lens tabs 30T. Lens tabs 30T may be formed as integral portions of the material that forms lens 30 and/or may be formed from different material. For example, lens tabs 30T and a lens element in lens 30 may be formed as parts of the same molded polymer member or tabs 30T may be formed from a different material than the lens element from which tabs 30T protrude (e.g., tabs 30T may be formed from insert molded metal structures or other non-polymer members, a polymer material that differs from the polymer material used in forming the bulk of lens 30, a polymer that is formed as a second shot or first shot in a two-shot molding process that is also used in forming an associated lens element, etc.). Tabs 30T may be formed on one or both of the lens elements in lens 30. Configurations in which tabs 30T are formed as integral portions of one of the lens elements in lens 30 are sometimes described herein as an example.

The use of engagement structures formed from protruding lens tabs 30T may help reduce lens bulk and thereby provide additional space around lens 30. For example, the lens of FIG. 5 may be sufficiently small (e.g., the lens may have a sufficiently compact lens footprint) to avoid contacting a user's eye brow at location 52A and a user's nose at location 52B, while still having lens tab mounting points that are sufficiently far apart to engage with the sides of lens barrel 32. Non-circular (e.g., oval-shape) lens configurations of the type shown in FIG. 5 or other lens shapes with non-circular outlines may help provide a user with a desired field-of-view when viewing images on display 14. A retaining ring of the type that is sometimes used to hold circular lens elements in place in a system will not generally mate smoothly with the periphery of a non-circular lens and/or a lens with aspheric surfaces. By using lens tabs 30T, lens 30 can be mounted in lens barrel 32 satisfactorily, even when the outline of lens 30 is non-circular and/or when lens 30 has aspheric surfaces.

Figure 6:
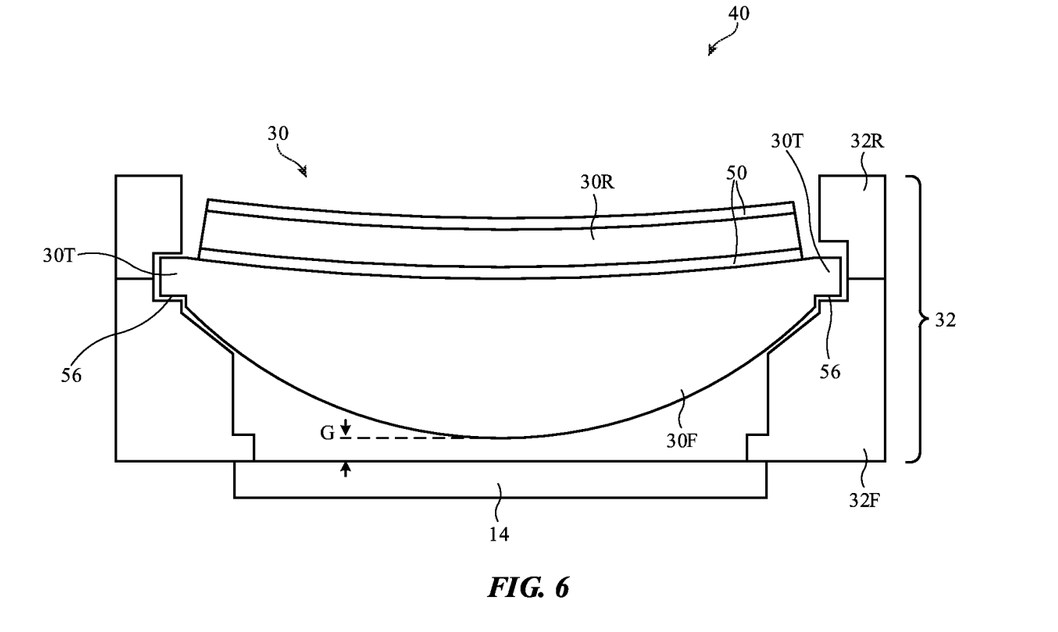
FIG. 6 is a side view of an illustrative optical module in which lens tabs have been formed on a front lens element in accordance with an embodiment.

A cross-sectional side view of an illustrative optical module with a catadioptric polymer lens is shown in FIG. 6. As shown in FIG. 6, module 40 may include lens barrel 32. Lens barrel 32 may be formed from a single structural member or may be formed from multiple members that that are joined using fasteners, adhesive, welds, and/or other attachment structures. In the example of FIG. 6, lens barrel 32 has a first ring-shaped member 32F at the front of barrel 32 and has a second ring-shaped member 32R at the rear of barrel 32. One or more additional structural elements may be added to lens barrel 32, if desired. Adhesive, fasteners, welds, and/or other attachment structures may be used to join lens barrel members 32F and 32R. Lens 30 may be mounted in lens barrel 32 by mounting lens 30 to member 32R followed by attachment of member 32F or may, as shown in the example of FIG. 6, be mounted to member 32F followed by attachment of member 32R to member 32F to form barrel 32.

Tabs 30T and lens barrel 32 may have mating planar surfaces. Planar outwardly facing surfaces 56 of tabs 30T may rest on corresponding inwardly facing planar surfaces on lens barrel member 32F. Lens tab surfaces 56, which may be molded surfaces (e.g., surfaces formed from molded polymer, molded glass, etc.), machined surfaces (e.g., surfaces created by machining material with a computer numerical control tool or other machining tool), or surfaces formed using other techniques, may lie in one or more different planes or may be coplanar. The corresponding planar surfaces of lens barrel member 32F may be located in one or more corresponding different planes or may be coplanar. A coplanar mounting surface arrangement may help avoid rocking of lens 30 after lens 30 has been mounted within barrel 32. There may be at least three, at least four, at least five, at least six, fewer than ten, fewer than seven, fewer than five, or fewer than four lens tabs 30T. In the illustrative arrangement of FIGS. 5 and 6, there are four lens tabs 30T spread out evenly along the perimeter of lens 30. For example, each tab may be separated from its adjacent tabs by a 90° angular separation measured from the optical axis of lens 30 (within +/−30%, +/−15%, or other suitable angular variation).

The use of lens tabs 30T may help accurately control the separation G of lens 30 from the rearwardly facing surface of display 14. There may be, for example, a relatively small gap G (e.g., 0.5 mm, at least 0.1 mm, less than 2 mm, less than 1 mm, etc.) between element 30F and display 14. By using lens tabs 30T to mount lens 30 to barrel 32, this gap (and a corresponding gap between the rear surface of element 30R and the rear surface of barrel 32) may be controlled satisfactorily. The use of lens tabs 30 may also help reduce stress in lens 30 and thereby reduce stress-induced birefringence. During use of device 10, forces on lens 30 are transmitted through lens tabs 30T rather than directly into the lens elements of lens 30, which may enhance reliability.

During molding operations, polymer in a mold may experience turbulence. The use of tabs 30T may help reduce turbulence in the clear aperture of lens 30, thereby enhancing the optical quality of lens 30. There is a potential for coefficient-of-thermal-expansion mismatch in the structures of module 40. The use of lens tabs 30T may help absorb mismatch between lens 30 and barrel 32 and may help thermally isolate lens 30 from barrel 32. In some configurations, the areas on barrel 32 to which lens tabs 30T mount may be cooler than areas of lens 30 near display 14. By locating the mounting structures of lens 30 in such cool zones, coefficient-of-thermal-expansion mismatch may be further reduced.

In the illustrative mounting configuration of FIG. 6, lens tabs 30T are formed on front lens element 30F. With this arrangement, lens 30 may mounted to lens barrel member 32F (e.g., so that front-facing coplanar lens tab surfaces 56 rest against mating coplanar rear-facing coplanar mounting surfaces). Lens barrel member 32R may then be attached to member 32F to capture lens tabs 30T.

Figure 7:
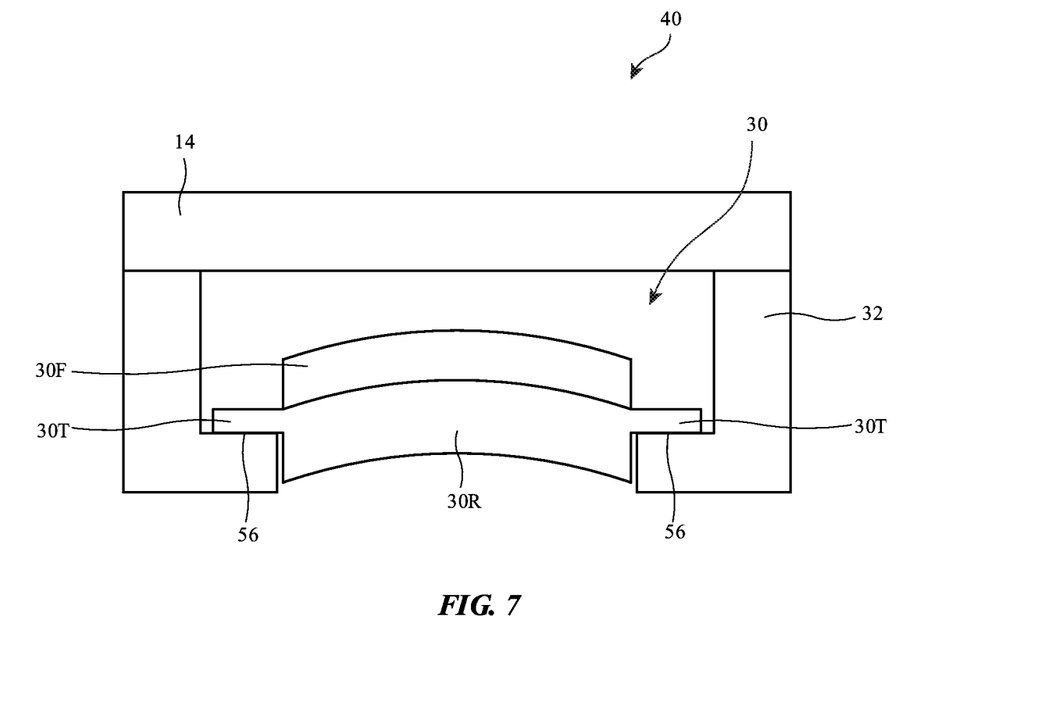
FIG. 7 is a side view of an illustrative optical module in which lens tabs have been formed on a rear lens element in accordance with an embodiment.

If desired, lens tabs 30T may be formed as part of rear lens element 30R. This type of arrangement is shown in FIG. 7. In the example of FIG. 7, coplanar lens tabs surfaces 56 face forward and the mating coplanar mounting surfaces of barrel 32 face rearwardly. Lens 30 in this type of configuration may be installed into barrel 32 from the front rather than from the rear (as an example).

Figure 8A:
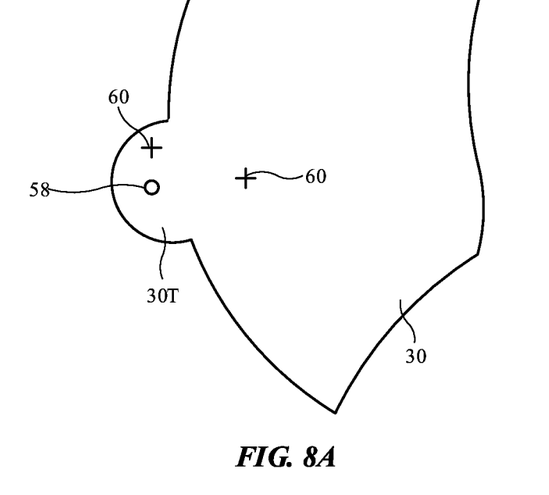
FIG. 8A shows a portion of a lens element and an associated lens tab with alignment marks in accordance with an embodiment.

FIG. 8A shows how lens tabs 30T may have optional structural features such as recesses or other openings (e.g., grooves or other openings that extend partway through tabs 30T, slots, and/or through-hole openings), ridges, prongs, and/or other protrusions, etc. In the example of FIG. 8A, lens tab 30T has been provided with an optional opening 58 (e.g., a partial opening or through-hole opening). Openings such as opening 58 may receive corresponding alignment and mounting structures on barrel 32 and/or may be used to accommodate screws or other fasteners. Structures on lens tabs 30T such as opening 58 may, if desired, serve as datums in aligning lens 30 to barrel 32. Alignment marks 60 may be located in correspondence to aspects of the lens surface such as the optical axis. Thereby, alignment of aspects of the lens surface can be carried out by using alignment marks such as alignment marks 60. Alignment marks 60, which may sometimes be referred to a registration marks or fiducials, may be formed from printed structures (e.g., printed ink), deposited metal or other applied structures on one or both surfaces of a lens element, may be formed from laser markings, molded marks, and/or machined marks. Alignment marks 60 may be formed from grooves and/or protrusions formed in one or both surfaces of a lens element, may be insert-molded structures, and/or may be any other optically identifiable fiducials. Lens tabs such as tab 30T may be formed during the same polymer molding operation that is used in forming the lens element from which the tabs protrude and/or may be formed using other techniques.

In some configurations, alignment marks 60 may be formed on peripheral portions of lens elements 30R and/or 30F without being formed on tabs 30T. For example, alignment marks 60 may be formed on the concave and/or convex molded lens surfaces of lens elements 30R and/or 30F by molding these marks into the molded optical surfaces of the lens elements during molding of lens elements 30R and/or 30F (e.g., alignment marks 60 on peripheral portions of the lens may be molded coincidentally with the lens element 30R or 30F to provide a repeatable location of the alignment marks). In this way, the molded marks 60 are formed in correspondence with the optical surfaces of which they are a part, which may help improve the accuracy and repeatability of the molded marks 60 relative to the lens optical axis. In these optical surface alignment mark locations, alignment marks may sometimes be covered with polarizers and other optical layers, but may be viewed through these optical layers during alignment operations. Accordingly, alignment marks 60 that are not located on tabs 30T may assist in visual alignment operations during assembly of lens 30 and module 40 (e.g., when aligning lens element 30R with respect to lens element 30F). In addition to or instead of forming alignment marks 60 away from lens tabs 30T, one or more alignment marks 60 may be formed on one or both sides of each lens tab 30T, as shown in FIG. 8A. In these locations, alignment marks 60 will not generally be overlapped and potentially obscured by optical films in lens 30 and may, if desired, be aligned with corresponding optional alignment marks on lens barrel 32.

Figure 8B:
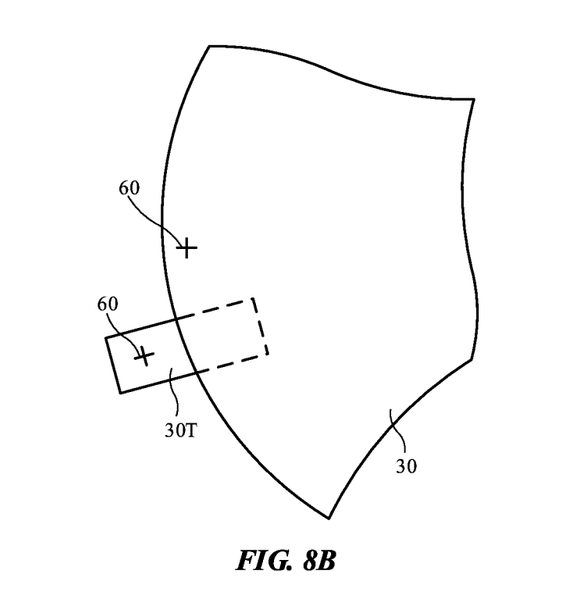
FIG. 8B shows a portion of a lens element and an associated lens tab formed from a different material than the rest of the lens element in accordance with an embodiment.

FIG. 8B shows a portion of a lens element in lens 30 and an associated lens tab 30T in an illustrative configuration in which lens tab 30T is formed from a different material than the rest of the lens element from which the tab protrudes. The lens element may, as an example, be formed from optically clear polymer. Tab 30T of FIG. 8B may be formed from a second shot of polymer (e.g., tab 30T may be formed from a second polymer shot made up of the same type of polymer or a different type of polymer than the polymer of the lens element). Tab 30T may be molded over a portion of a lens element structure or a lens element structure may be molded over tab 30T. If desired, tab 30T may be formed from glass, metal, and/or other materials (e.g., a tab 30T may be formed from a non-polymer tab member over which polymer for a lens element is molded), may be a tab member that is screwed into the edge of lens 30, and/or may be a tab member that is attached to the lens element using other attachment mechanisms (e.g., fasteners, adhesive, laser welding, etc.).

Figure 9:
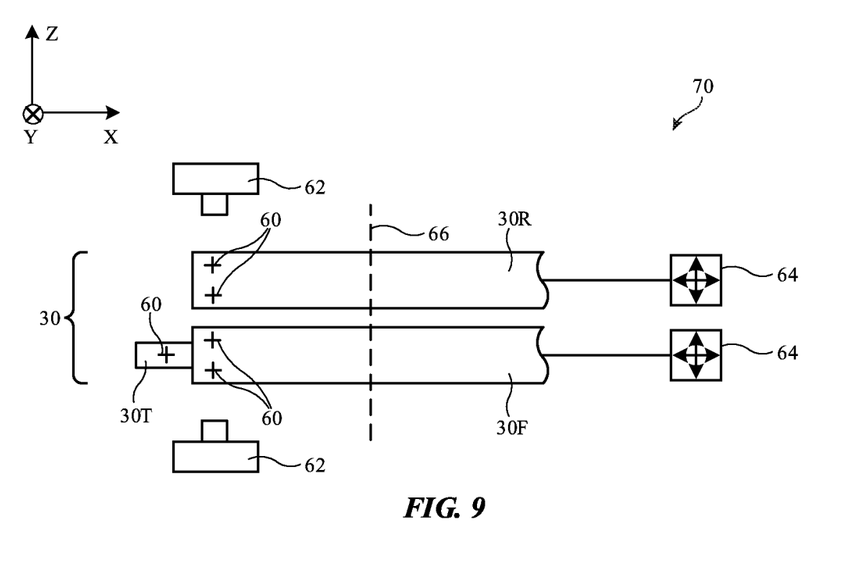
FIG. 9 is a cross-sectional side view of illustrative lens assembly equipment that may be used to align lens elements that have alignment marks in accordance with an embodiment.

An illustrative assembly system that may be used in assembling lens 30 and/or module 40 is shown in FIG. 9. As shown in FIG. 9, system 70 may have one or more cameras such as cameras 62. Positioners 64 may be used to position lens elements 30R and 30F with respect to each other and/or with respect to lens barrel 32. Positioners 64 may be controlled manually and/or by a computer (e.g., tool 70 may use a machine vision control arrangement in which images from cameras 62 are processed to determine how to adjust positioners 64). Positioners 64 may make adjustments in X, Y, and Z and/or any desired angular adjustments (tilt and/or rotation).

Alignment marks 60 may be used to help align the structure of optical module 40 during assembly operations. For example, by lining up mating alignment marks 60 and/or by otherwise positioning alignment marks at desired locations (e.g., at desired positions with respect to absolute reference points in equipment 70), lens element 30R can be aligned satisfactorily with lens element 30F while lens elements 30R and 30F are being attached together to form lens 30. As shown in FIG. 9, alignment marks 60 may, if desired, be formed on lens tabs 30T and/or on upper and/or lower surfaces of each lens element. By inspecting overlapping marks 60 on the upper and lower surfaces of a lens element, the lens elements can be positioned in alignment with axis 66. Following alignment, fasteners (e.g., screws, etc.), adhesive, clamps or other mechanical attachment structures, and/or other attachment mechanisms in module 40 may be used by system 70 to secure the lens elements of lens 30, lens barrel 32, and/or other components of optical module 40 in desired positions with respect to each other. Alignment and assembly operations that are made by monitoring alignment marks 60 in system 70 may be used to align the optical centers of lens elements 30F and 30R with respect to each other, may be used to rotationally align lens elements 30F and 30R about axis 66 with respect to each other, and/or may be used to achieve angular alignment between elements 30F and 30R (e.g., to remove undesired tilt between the surfaces of lens elements 30F and 30R). Alignment operations using marks 60 may also be used to ensure that lens tabs 30T are positioned at desired locations with respect to barrel 32 and/or to otherwise align lens 30 with respect to barrel 32 and the other components of module 40.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device optical module, comprising:
a support structure having support surfaces;
a display coupled to the support structure; and
a lens having lens tabs with lens tab surfaces, wherein the lens is configured to provide an image from the display to an eye box and wherein the lens tab surfaces are configured to mate respectively with the support surfaces of the support structure; and
an alignment mark on the lens.

2. The head-mounted device optical module defined in claim 1 wherein the alignment mark is on one of the lens tabs, wherein the lens comprises a catadioptric lens having first and second lens elements that are attached to each other, wherein the lens tabs are formed from portions of the first lens element, wherein the support surfaces are coplanar, and wherein the lens tab surfaces are coplanar.

3. The head-mounted device optical module defined in claim 1 wherein the support structure comprises a lens barrel and wherein the support surfaces are coplanar support surfaces formed in the lens barrel.

4. The head-mounted device optical module defined in claim 3 wherein the lens has a non-circular outline and an aspheric surface and wherein the lens tab surfaces are coplanar.

5. The head-mounted device optical module defined in claim 4 wherein the lens comprises a catadioptric lens.

6. The head-mounted device optical module defined in claim 5 wherein the catadioptric lens has first and second lens elements that are attached to each other.

7. The head-mounted device optical module defined in claim 6 wherein the lens tabs are formed in the first lens element.

8. The head-mounted device optical module defined in claim 7 wherein the first lens element is formed from polymer material and wherein the lens tabs are formed from the polymer material.

9. The head-mounted device optical module defined in claim 7 wherein the first lens element is formed from a first material and wherein the lens tabs are formed from a second material that is different than the first material.

10. The head-mounted device optical module defined in claim 1 wherein the lens comprises an optical surface, and the alignment mark is located on the optical surface.

11. The head-mounted device optical module defined in claim 1 wherein the alignment mark is located on one of the lens tabs.

12. The head-mounted device optical module defined in claim 1 wherein the lens comprises first and second lens elements joined along opposing cylindrical surfaces, the alignment mark is one of multiple alignment marks, and the alignment marks are located on opposing surfaces of the first lens element and on opposing surfaces of the second lens element.

13. The head-mounted device optical module defined in claim 1 wherein the lens comprises glass and wherein the lens tab surfaces comprise machined surfaces.

14. The head-mounted device optical module defined in claim 1 wherein the lens comprises polymer and wherein the lens tab surfaces comprise machined surfaces.

15. The head-mounted device optical module defined in claim 1 wherein the lens comprises glass.

16. The head-mounted device optical module defined in claim 1 wherein the lens comprises molded glass.

17. A head-mounted device, comprising:
a housing; and
optical modules supported by the housing and configured to provide images to eye boxes, wherein each optical module comprises:
a lens barrel, wherein the lens barrel is a hollow structure and comprises recessed portions;
a display coupled to the lens barrel; and a lens in the lens barrel that provides an image from the display to a corresponding one of the eye boxes, wherein the lens barrel has first planar surfaces and wherein the lens has protruding portions with second planar surfaces that mate respectively with the first planar surfaces within the recessed portions.

18. The head-mounted device defined in claim 17 wherein the lens comprises an optical surface with an alignment mark.

19. The head-mounted device defined in claim 18 wherein the optical surface comprises a molded optical surface and wherein the alignment mark comprises a molded alignment mark on the molded optical surface.

20. The head-mounted device defined in claim 17 wherein the lens comprises a lens surface, the lens further comprising alignment marks on the protruding portions that are positioned in correspondence to aspects of the lens surface.

21. The head-mounted device defined in claim 17 wherein the lens comprises a lens surface, the lens further comprising alignment marks on the lens surface that are positioned in correspondence to aspects of the lens surface.

22. The head-mounted device defined in claim 17 wherein the lens comprises polymer lens elements and wherein the protruding portions are formed from parts of one of the polymer lens elements.

23. The head-mounted device defined in claim 22 wherein the protruding portions form molded lens tabs with coplanar lens tab surfaces.

24. The head-mounted device defined in claim 22 wherein the lens has first and second polymer lens elements and wherein opposing surfaces of the first polymer lens element have alignment marks.

25. The head-mounted device defined in claim 17 wherein the lens comprises first and second molded polymer lens elements and wherein the lens has a non-circular outline and an aspheric surface.

26. A lens, comprising:
a first molded polymer lens element having an aspheric surface and a non-circular outline and having molded protrusions that form lens tabs with coplanar surfaces; and
a second molded polymer lens element that is attached to the first lens element.

27. The lens defined in claim 26 further comprising an alignment mark on each of the molded protrusions.

28. The lens defined in claim 26 further comprising a molded alignment mark on the first or second molded polymer lens element.

29. The head-mounted device optical module defined in claim 1 wherein the lens comprises a molded optical surface, and the alignment mark is molded into the molded optical surface.

30. The head-mounted device defined in claim 17 wherein the lens barrel comprises first and second ring-shaped members and wherein the recessed portions are inset in the first and second ring-shaped members.

* * * * *